United States Patent
Yoneda et al.

(10) Patent No.: US 6,785,740 B1
(45) Date of Patent: Aug. 31, 2004

(54) TEXT-MESSAGING SERVER WITH AUTOMATIC CONVERSION OF KEYWORDS INTO HYPERLINKS TO EXTERNAL FILES ON A NETWORK

(75) Inventors: Michiaki Yoneda, Kanagawa (JP); Tsunetake Noma, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/539,045
(22) Filed: Mar. 30, 2000

(30) Foreign Application Priority Data

Mar. 31, 1999 (JP) .......................................... P11-092663

(51) Int. Cl.[7] .......................... G06F 15/173; G06F 17/21
(52) U.S. Cl. ..................... 709/246; 709/206; 715/501.1
(58) Field of Search ............................... 709/203, 219, 709/217, 245, 227, 204, 206, 246; 707/102, 101, 10; 715/501.1

(56) References Cited

U.S. PATENT DOCUMENTS

| | | | | | |
|---|---|---|---|---|---|
| 5,764,916 A | * | 6/1998 | Busey et al. | ........... | 395/200.57 |
| 5,987,503 A | * | 11/1999 | Murakami | ................... | 709/204 |
| 6,014,136 A | * | 1/2000 | Ogasawara et al. | ......... | 345/331 |
| 6,370,563 B2 | * | 4/2002 | Murakami et al. | .......... | 709/205 |
| 6,415,294 B1 | * | 7/2002 | Niemi | ......................... | 707/102 |
| 6,433,795 B1 | * | 8/2002 | MacNaughton et al. | .... | 345/738 |
| 6,446,112 B1 | * | 9/2002 | Bunney et al. | ............. | 709/204 |

* cited by examiner

*Primary Examiner*—Dung C. Dinh
(74) *Attorney, Agent, or Firm*—Oblon, Spivak, McClelland, Maier & Neustadt, P.C.

(57) ABSTRACT

An apparatus, a method and a medium for providing and processing information, whereby users of a chat system send easily and rapidly to one another a URL for uniquely designating the location of a file on the Internet. A hard disk drive of a WWW server records predetermined keywords and addresses for uniquely designating the locations of information corresponding to these keywords. A CPU of the WWW server receives any one of the keywords which is included in text data from an information processing apparatus, and translates the keyword into data with a tag related to the address corresponding to the keyword in question.

9 Claims, 11 Drawing Sheets

```
<HTML>
<HEAD>
<TITLE>SimpleChat</TITLE>
</HEAD>
<BODY BGCOLOR="#FFFFFF">
<form method="get" action="Chat.cgi" target="view">
<input type="text" name="input" size="60">
<input type="submit" value="remark">
<input type="reset" value="erase"><BR>
<input type="hidden" name="view" value="view">
<input type="hidden" name="handle" value="yoneda">
</form>
<form method="get" action="/servlets/SimpleChat" target="_top">
<input type="submit" value="return">
<input type="hidden" name="bye" value="true">
<input type="hidden" name="handle" value="yoneda">
</form>

</BODY>
</HTML>
```

```
<HTML>
<HEAD>
<TITLE>SimpleChat</TITLE>
</HEAD>
<BODY BGCOLOR="#FFFFFF">
<HR>

YONEDA : <A HREF="http://vaio.sony.co.jp">VAIO</A> is cool, isn't it ? <BR><HR>
NOMA : Hello ! <BR><HR>
PARU : Hi ! <BR><HR>
</BODY>
</HTML>
```

```
<HTML>
<HEAD>
<TITLE>Chat</TITLE>
</HEAD>
<FRAMESET ROWS="30%,*">
<FRAME SRC="input.html"   TARGET="_self"   NAME="submit">
<FRAME SRC="message.html"   NAME="view">
</FRAMESET>
</HTML>
```

TEXT-MESSAGING SERVER WITH AUTOMATIC CONVERSION OF KEYWORDS INTO HYPERLINKS TO EXTERNAL FILES ON A NETWORK

BACKGROUND OF THE INVENTION

The present invention relates to an information providing and processing apparatus, an information providing and processing method, and an information providing and processing program storage medium for constituting illustratively a chat system or a bulletin board system.

There is widespread acceptance today of so-called chat systems and bulletin board systems whereby multiple users of personal computers interconnected over the Internet communicate with one another by having their computers send, receive and display text via suitable servers.

Each user's personal computer has a screen which displays the user's and other users' remarks in text and through which the user's remarks are sent in text when so designated. The screen through which to send each user's remarks comprises a text input field and a "SEND" button. After entering a remark into the field, the user clicks on the "SEND" button to get the remark displayed on the screens of all currently communicating users, i.e., the screens of the sending and receiving users.

With a typical chat system, a remark-entering user's name and his or her remark are displayed line by line on the personal computer screens of the user in question and of the other connected users. When an appropriate button is manipulated on the computer or upon elapse of a predetermined period of time, the name of the remark-entering user is read from a suitable server along with his or her remarks in text.

With a bulletin board system, a list of titles about remarks appears on the screen of each user's personal computer. The titles are linked to pages of the applicable remarks in text. When a user clicks on a given title of remarks in the list, the remarks in question appear in text on the user's personal computer screen.

When a user wants to send a desired URL (Uniform Resource Locator) to other users through a chat system or a bulletin board system, the user must write in full the URL such as "http://vaio.sony.co.jp/" to the text of remarks.

In communicative setups such as chat systems and other networks, the user has thus been required conventionally to write an entire URL text such as "http://vaio.sony.co.jp/" when sending the URL in question to other users. The need to write whole URLs has been tedious and troublesome for the users.

SUMMARY OF THE INVENTION

The present invention has been made in view of the above circumstances and provides an apparatus, a method and a medium for easily and quickly sending to other users' addresses for uniquely identifying where specific information is located.

In carrying out the invention and according to one aspect thereof, there is provided an information providing and processing apparatus for supplying a file over a network to an information processing apparatus requesting the file which is written in a predetermined page description language and which describes information for linking to other files on the network, the information providing and processing apparatus including: a recording means for recording relations between a predetermined keyword on the one hand, and an address for uniquely designating a file corresponding to the keyword on the network on the other hand; and a translating means for translating the keyword included in text data received from the information processing apparatus into data with a tag related to the address corresponding to the keyword.

According to another aspect of the invention, there is provided an information providing and processing method for supplying a file over a network to an information processing apparatus requesting the file which is written in a predetermined page description language and which describes information for linking to other files on the network, the information providing and processing method including the steps of: recording relations between a predetermined keyword on the one hand, and an address for uniquely designating a file corresponding to the keyword on the network on the other hand; and translating the keyword included in text data received from the information processing apparatus into data with a tag related to the address corresponding to the keyword.

According to a further aspect of the invention, there is provided a medium for storing an information providing and processing program for supplying a file over a network to an information processing apparatus requesting the file which is written in a predetermined page description language and which describes information for linking to other files on the network, the information providing and processing program including the steps of: recording relations between a predetermined keyword on the one hand, and an address for uniquely designating a file corresponding to the keyword on the network on the other hand; and translating the keyword included in text data received from the information processing apparatus into data with a tag related to the address corresponding to the keyword.

Through the use of the above-outlined information providing and processing apparatus, information providing and processing method, and information providing and processing program storage medium according to the invention, relations are recorded between predetermined keywords on the one hand and addresses for uniquely designating files corresponding to the keywords on the other hand. Any one of such keywords included in text data from an information processing apparatus is translated into data with a tag related to the address corresponding to the keyword in question.

Other objects, features and advantages of the invention will become more apparent upon a reading of the following description and appended drawings.

DESCRIPTION OF THE PREFERRED EMBODIMENTS

Figure 1:
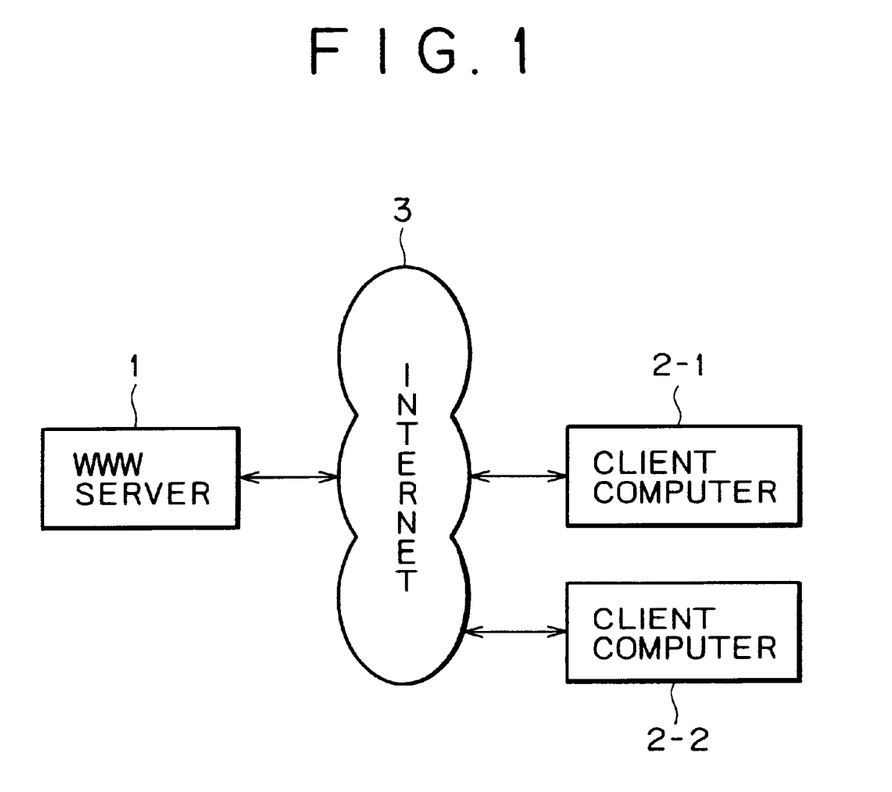
FIG. 1 is an explanatory view of a chat system.

FIG. 1 is an explanatory view of a chat system practiced as an embodiment of the present invention. In the system, computers on the client side (called the client computers 2-1 and 2-2 hereunder) may each transmit a user-input remark in text to a WWW (World Wide Web) server 1.

The WWW server 1 receives over the Internet 3 the user's remark in text from the client computer 2-1 or 2-2, and supplies the client computers 2-1 and 2-2 with data for causing the received remark to appear in text on screens of the computers.

From the WWW server 1, the client computers 2-1 and 2-2 receive over the Internet 3 the data for triggering the remark text display on their screens. This causes the user-input remark to be displayed on the screens of the client computers 2-1 and 2-2.

Each user who entered the remark and the other users of the client computers thus communicate with one another by looking at their remarks displayed in text on their computer screens. In the description that follows, the client computers 2-1 and 2-2 will be simply referred to as the client computer 2 where there is no specific need to distinguish them individually.

Figure 2:
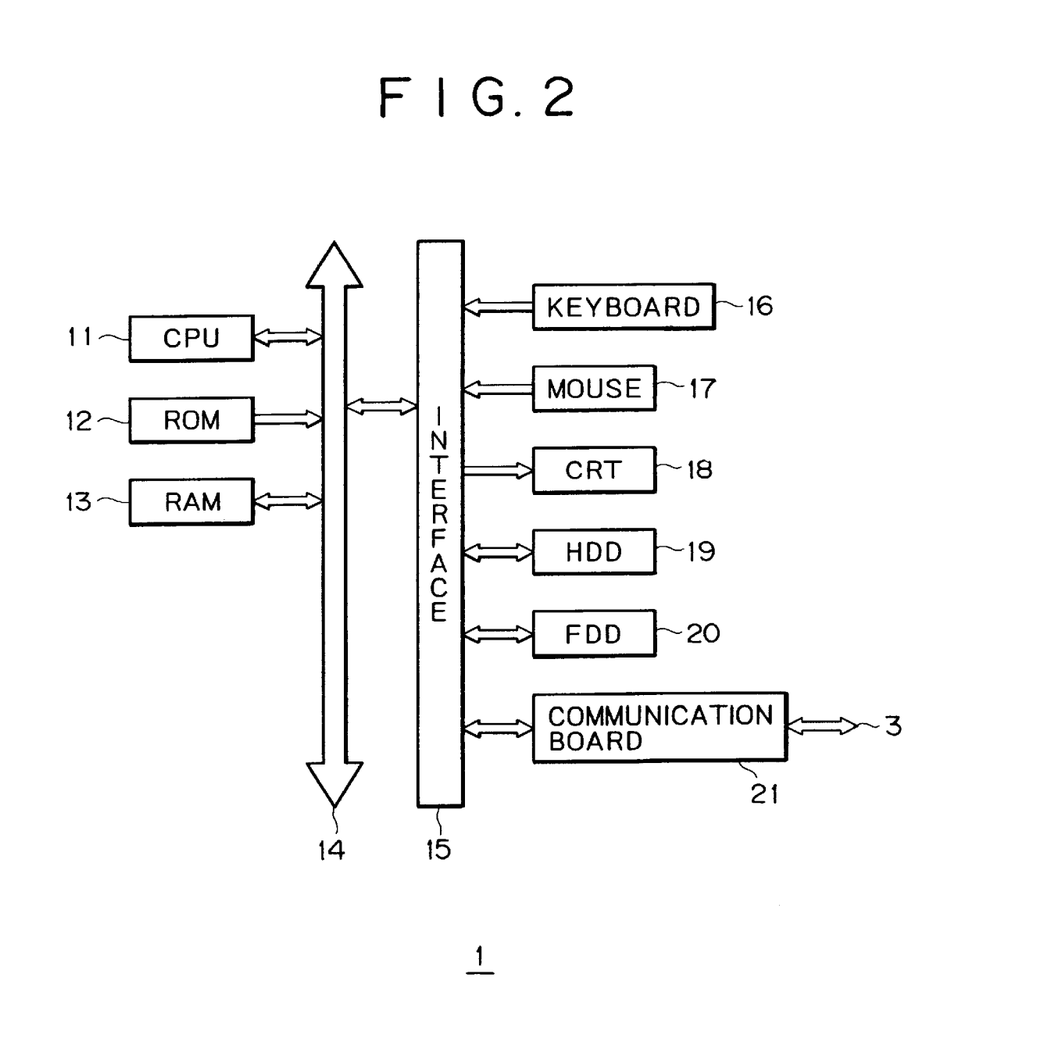
FIG. 2 is a block diagram of a WWW server.

FIG. 2 is a block diagram showing how the WWW server 1 is typically structured. A CPU (central processing unit) 11 executes various application programs such as CGI (Common Gateway Interface) as well as the basic operating system (OS). A ROM (read-only memory) 12 generally stores programs for use by the CPU 11 and basically fixed data included in operation parameters. A RAM (random-access memory) 13 stores programs being executed by the CPU 11 and variable parameters used during the program execution. These components are interconnected by a bus 14.

A keyboard 16 is operated by the user to enter various commands into the CPU 11. A mouse 17 is operated also by the user to point to and select fields on a screen of a CRT (cathode ray tube) 18. The CRT 18 displays various kinds of information in text or in image. A hard disk drive (HDD) 19 and a floppy disk drive (FDD) 20 drive a hard disk and a floppy disk respectively under control of the CPU 11 in recording or reproducing programs such as CGI as well as information.

A communication board 21 is a device designed to establish connection with the Internet 3. The board 21 is constituted illustratively by an Ethernet board.

The above components ranging from the keyboard 16 to the communication board 21 are connected to an interface 15. The interface 15 in turn is connected to the CPU 11 through the bus 14.

The client computer 2 has the same constitution as the WWW server 1 and thus will not be described further with respect to its structure.

Figure 3:
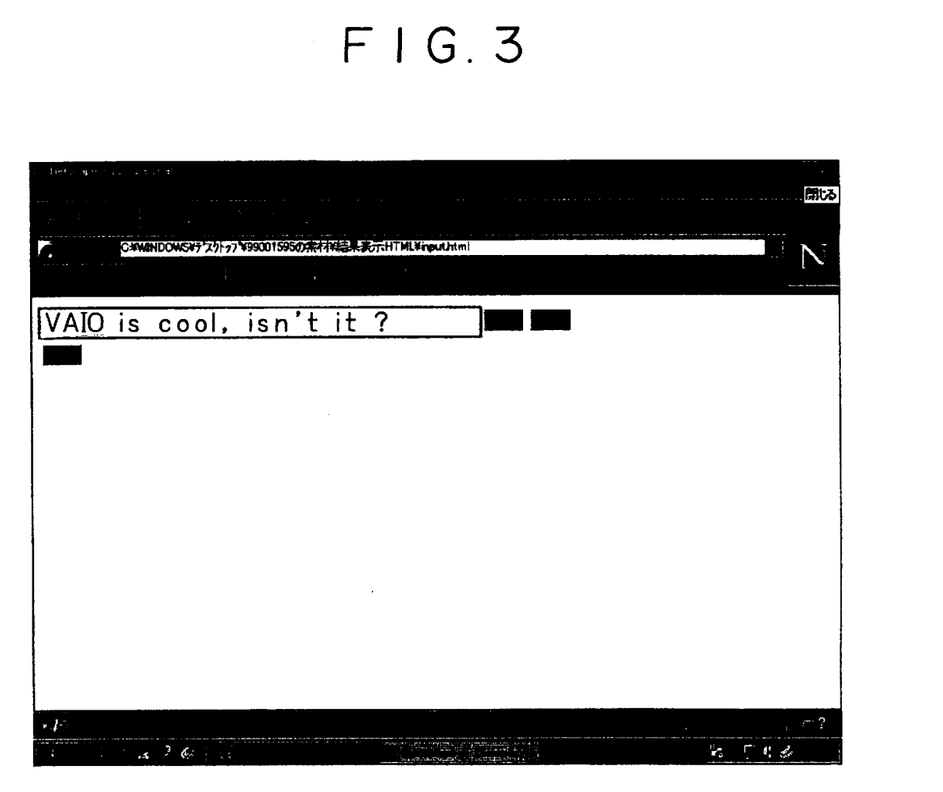
FIG. 3 is an explanatory view of a window that appears on a screen of a client computer.

Screen displays on the client computer 2 will now be described. FIG. 3 is an explanatory view of a window appearing on the screen of the client computer 2-1 through which remarks are sent out in text.

A WWW browser activated by the client computer 2-1 causes a specific screen such as that shown in FIG. 3 to appear on the screen of the client computer 2-1. The window thus displayed comprises a text input field into which the user may enter remarks, and a send button used to designate transmission of the remark text (the button is named "REMARK" in FIG. 3).

Illustratively, the user enters a remark in text such as "VAIO is cool, isn't it?" into the text input field and clicks on the send button. This causes the text in the field to be sent to the WWW server 1. The name "VAIO" is a registered trademark of this applicant.

Figure 4:
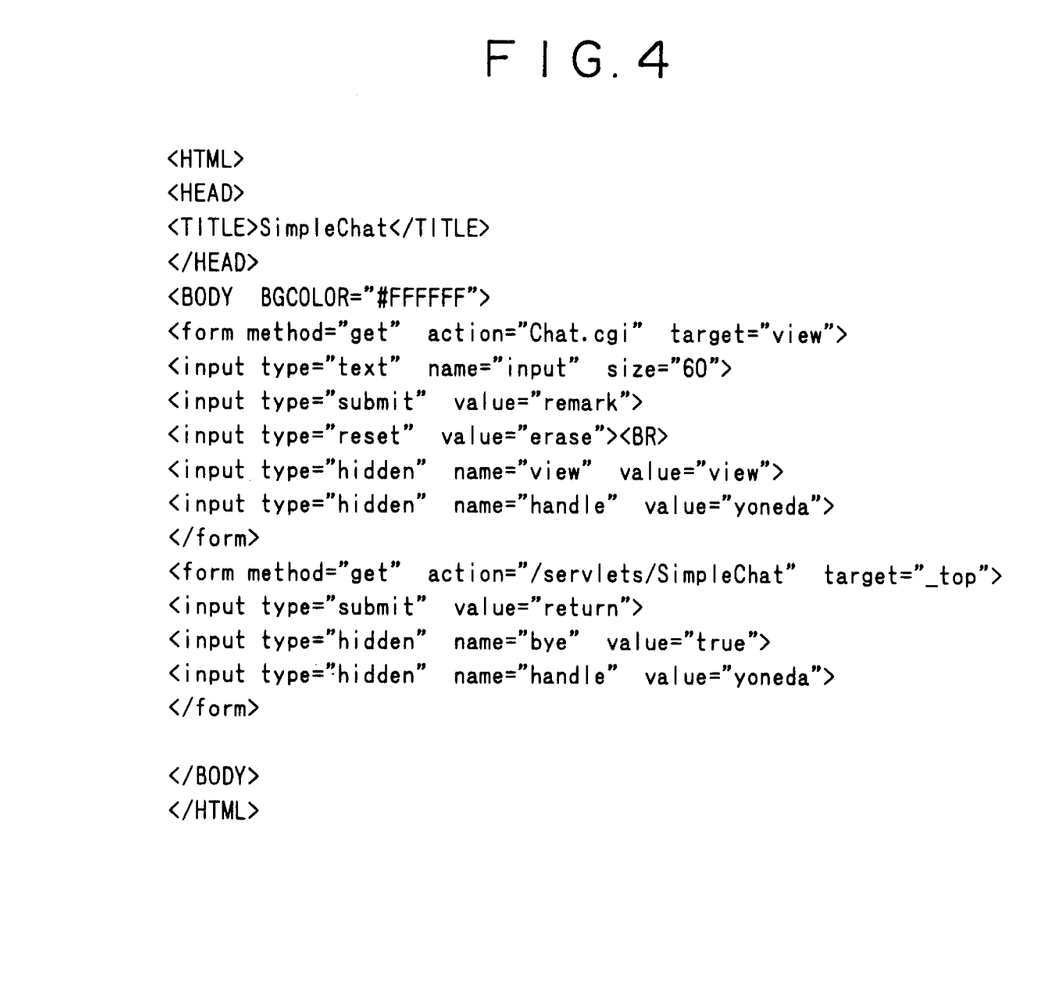
FIG. 4 is a view of a source program of an HTML file for displaying the window of FIG. 3.

FIG. 4 is a view of a source program of an HTML (Hypertext Markup Language) file for displaying the window of FIG. 3.

The WWW server 1 stores in advance predetermined keywords and URLs corresponding to the keywords. Upon receipt of text from the client computer 2-1, the WWW server 1 checks to see if the received text contains any one of the keywords stored inside. If any applicable keyword is found included in the text, the WWW server 1 replaces part of the matching text with a tag for linking to the stored URL corresponding to the keyword in question.

The WWW server 1 may illustratively cause each linking tag to be highlighted in bold face or in italics when displayed on the client computers 2-1 and 2-2.

The WWW server 1 sends to the client computers 2-1 and 2-2 data including the text partially replaced by the tag for linking to the relevant URL related to the keyword in the text.

Figure 5:
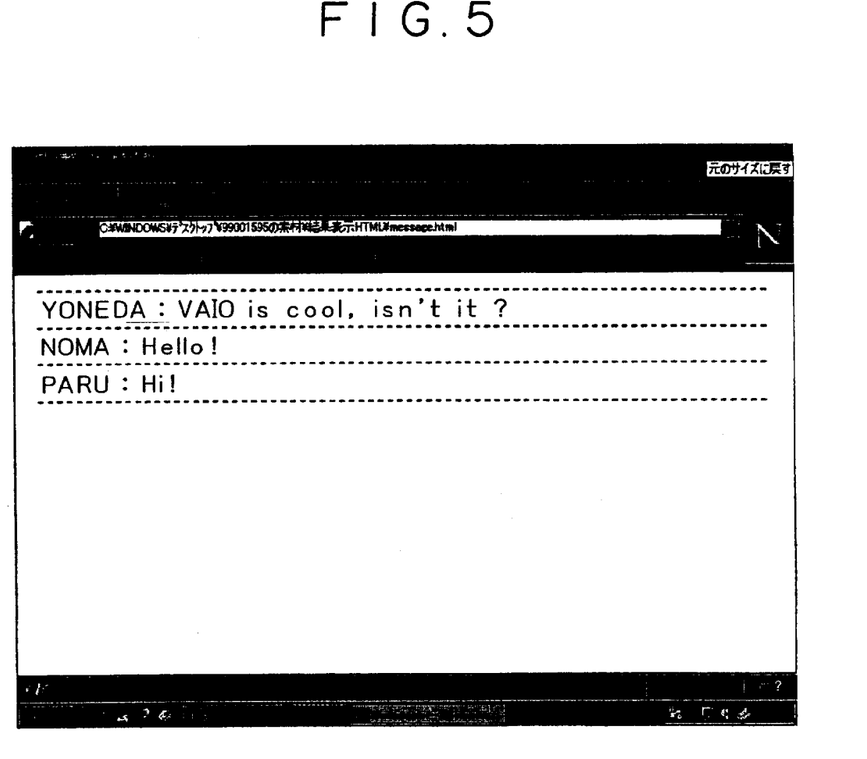
FIG. 5 is an explanatory view of another window that appears on the client computer screen.

FIG. 5 is an explanatory view of another window which appears on the screen of the client computer 2-1 or 2-2 and which displays text included in the data received from the WWW server 1. The window, which the WWW browser causes the client computer 2 to display, indicates the remarks in text made so far by all users.

In the window showing the remarks in text by all users, the client computers 2-1 and 2-2 display text that has been received from the WWW server 1 and partially replaced by URLs (in the example of FIG. 5, the text of "VAIO" is translated into a relevant tag).

Figure 6:
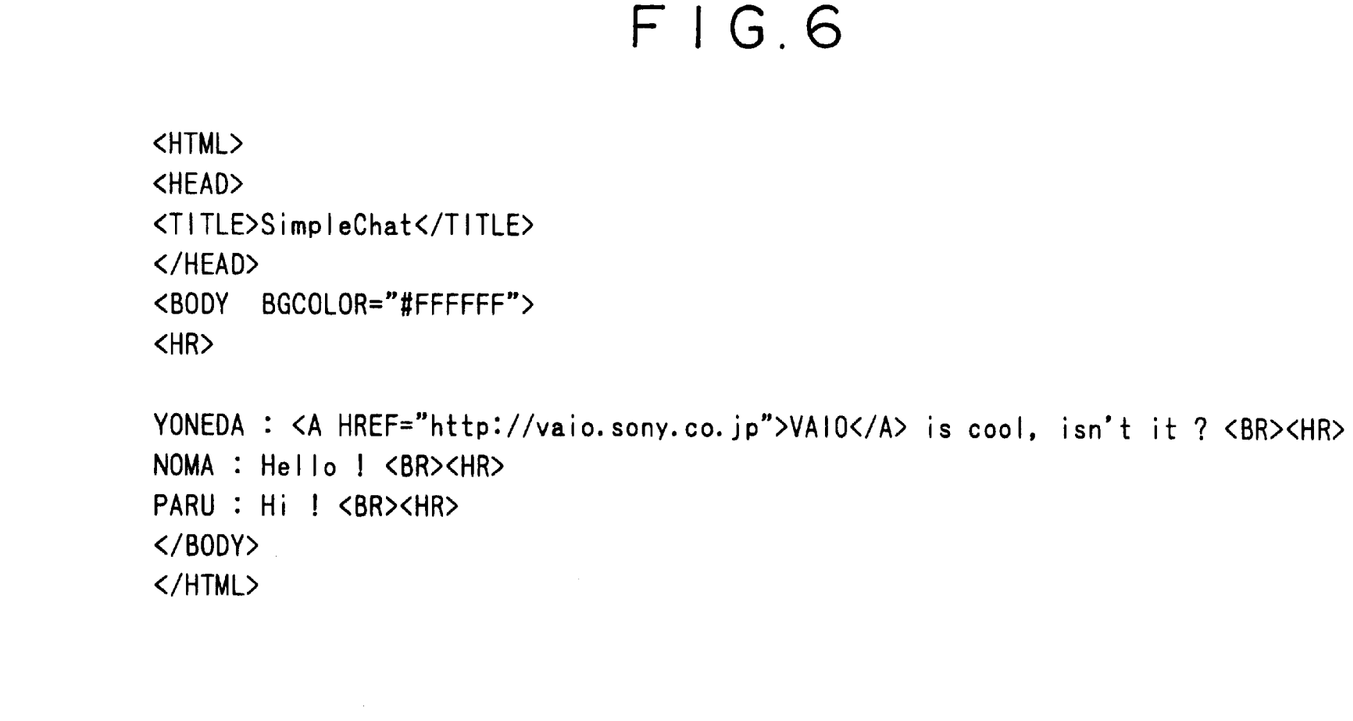
FIG. 6 is a view of a source program of an HTML file for displaying the window of FIG. 5.

FIG. 6 is a view of a source program of an HTML file for displaying the window of FIG. 5 (the file constitutes data sent from the WWW server 1 to the client computers 2-1 and 2-2). In the example of FIG. 6, the keyword "VAIO" is replaced by a tag "<A HREF="http://vaio.sony.co.jp/">VAIO</A>" for linking to the relevant URL.

As described, the user of the client computer 2-1 can send the relevant URL easily and quickly to the user of the client computer 2-2. In turn, the user of the client computer 2-2 can immediately make use of information from the file corresponding to the received URL.

Figure 7:
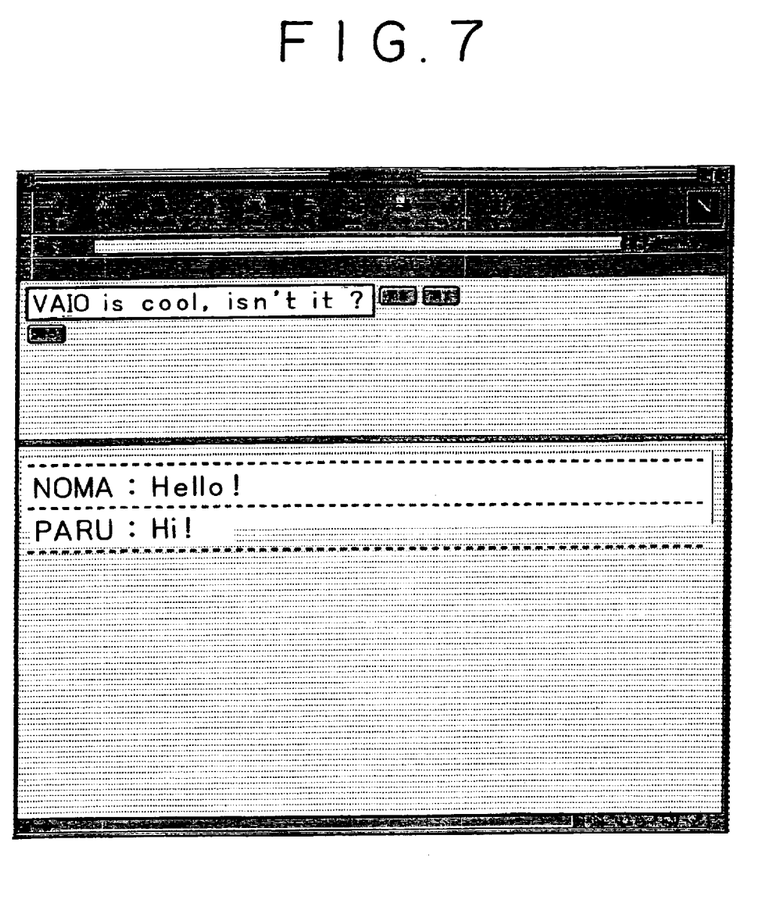
FIG. 7 is an explanatory view of another window that appears on the client computer screen.
Figure 8:
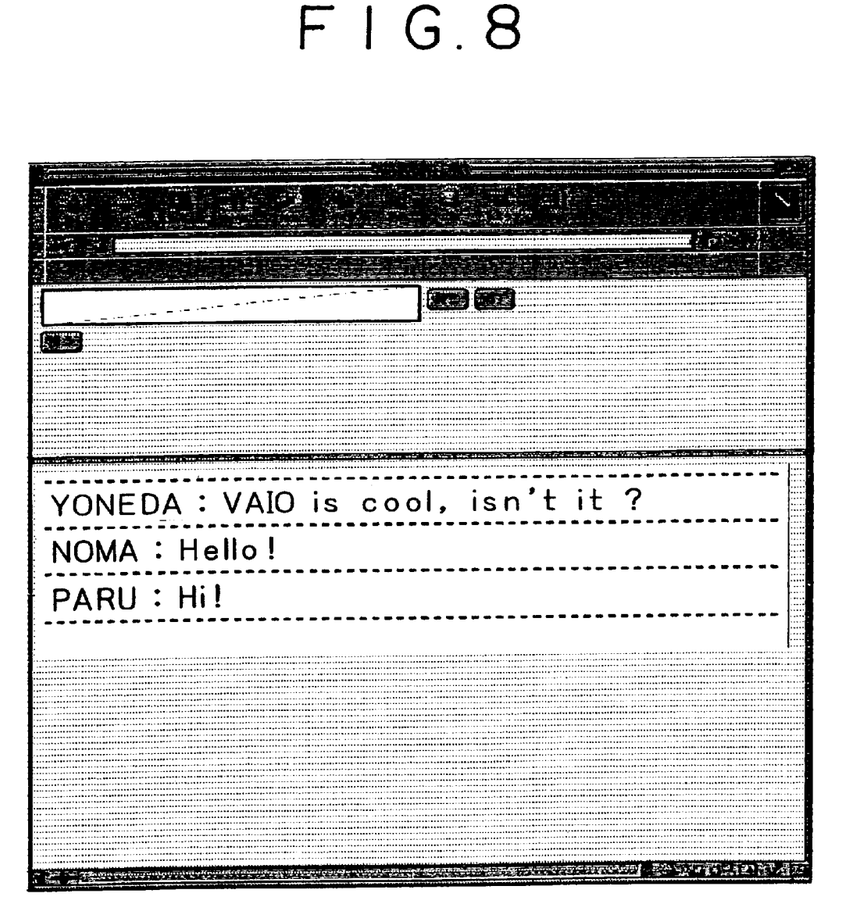
FIG. 8 is an explanatory view of another window that appears on the client computer screen.

As shown in FIGS. 7 and 8, the window of FIG. 3 through which to send out remarks in text and the window of FIG. 5 showing remarks in text from the WWW server 1 may be combined to form a single window on the screens of the client computers 2-1 and 2-2.

FIG. 7 is an explanatory view of another window that appears on the screen of the client computer 2-1 when its user has entered a given text (e.g., "VAIO is cool, isn't it?") into the text input field.

FIG. 8 is an explanatory view of another window that appears on the screens of the client computers 2-1 and 2-2 when the user of the client computer 2-1 sends a given text to the WWW server 1, with the client computers 2-1 and 2-2 receiving the text data from the WWW server 1.

Figure 9:
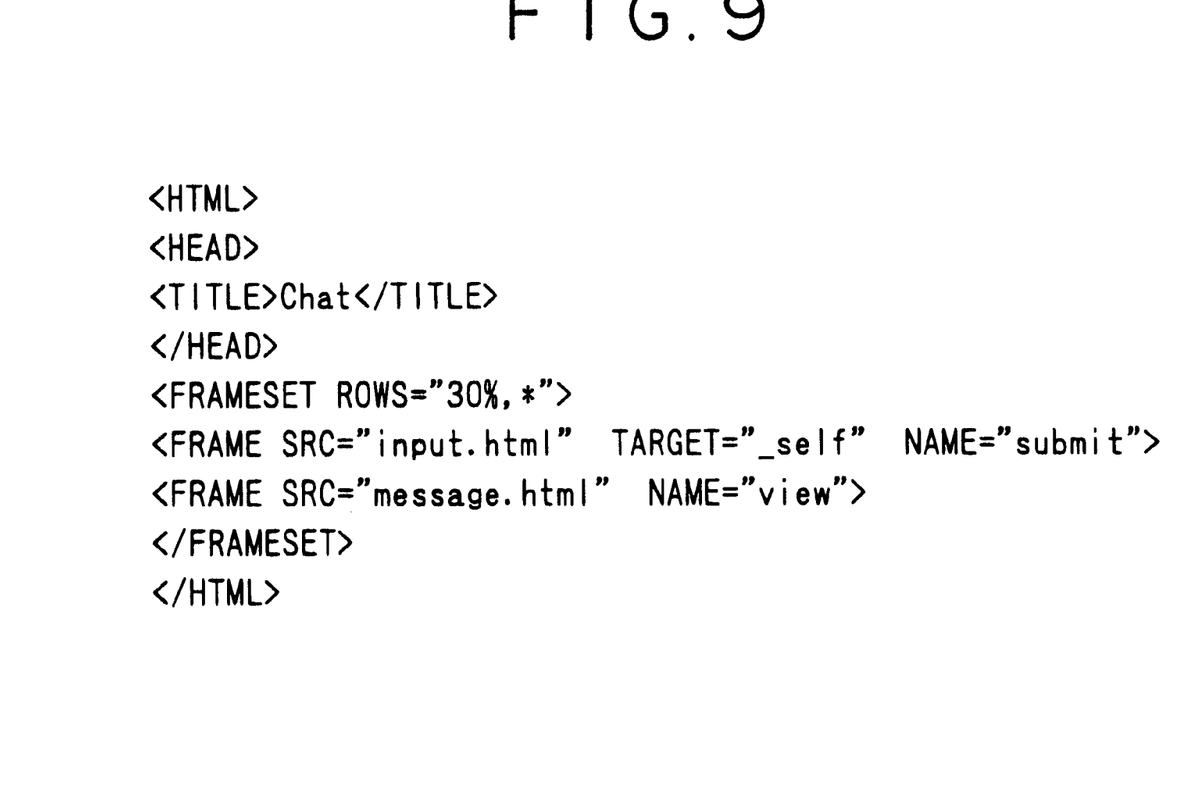
FIG. 9 is a view of a source program of an HTML file for displaying the window of FIG. 8.

FIG. 9 is a view of a source program of an HTML file for displaying a single window that combines the window of FIG. 3 through which to send out remarks in text with the window of FIG. 5 showing remarks in text from the WWW server 1. Cited in the source program of FIG. 9 are the HTML file (named "input.html") whose source program is shown in FIG. 4 and the HTML file (named "message.html") whose source program is indicated in FIG. 6.

Figure 10:
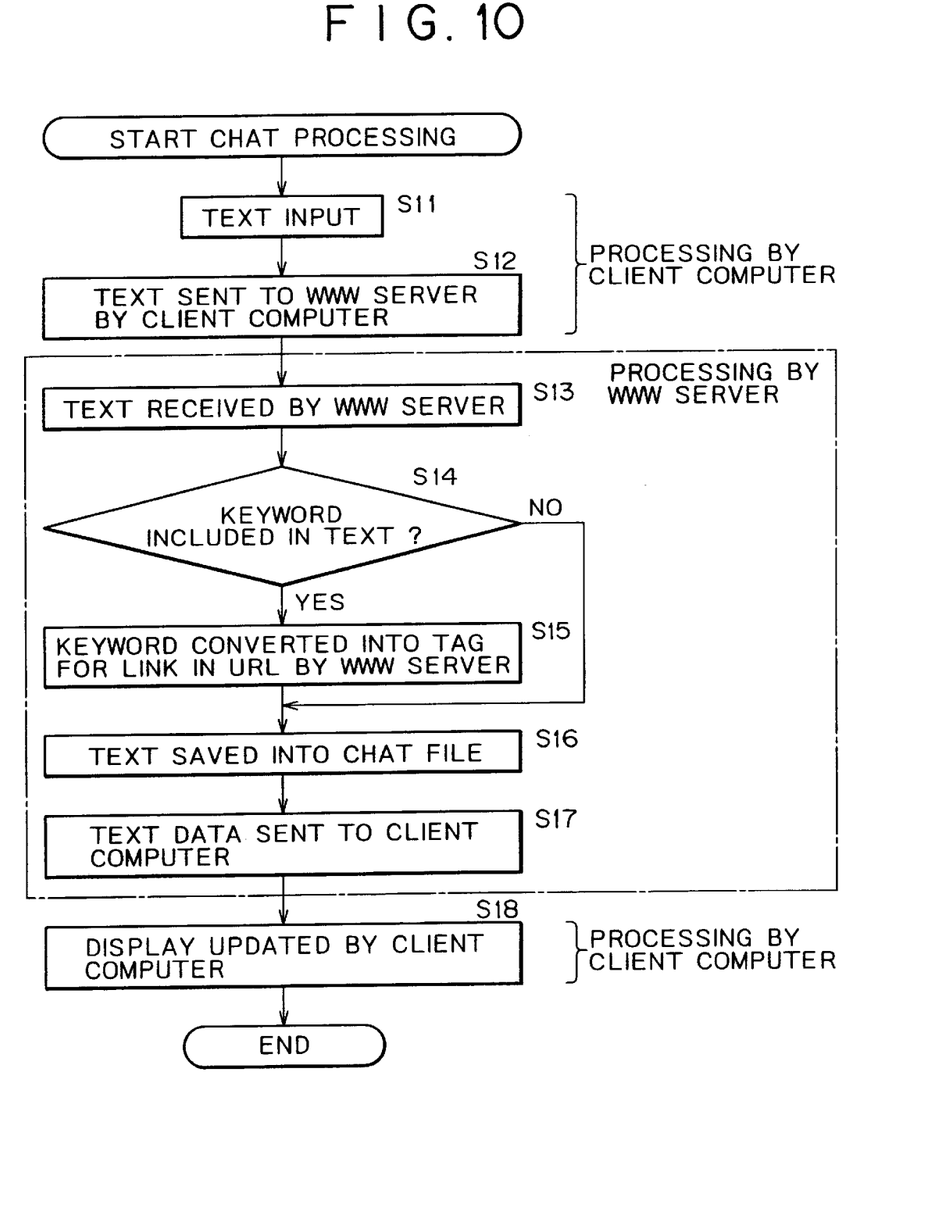
FIG. 10 is a flowchart of steps constituting chat processing of the chat system.

Chat processing of the chat system will now be described with reference to the flowchart of FIG. 10. In FIG. 10, steps S11 and S12 are performed by a client computer 2 sending a remark; steps S13 through S17 are carried out by the WWW server 1; and step S18 is executed by a client computer 2 receiving the remark. In step S11, a user inputs a remark in text through the client computer 2. In step S12, the client computer 2 sends the text entered in step S11 to the WWW server 1. In step S13, the CPU 11 of the WWW server 1 causes the communication board 21 to receive the remark in text coming from the client computer 2.

In step S14, the CPU 11 of the WWW server 1 checks to see if the received text contains any one of the previously stored keywords. If any such keyword is judged to be included in the received text, step S15 is reached. In step S15, the CPU 11 translates the keyword into a tag for linking to a relevant URL. Step S15 is followed by step S16.

If in step S14 the received text is judged to include none of the previously stored keywords, then step S15 is skipped and step S16 is reached.

In step S16, the CPU 11 of the WWW server 1 saves the text into a chat file on the hard disk drive 19. In step S17, the CPU 11 causes the communication board 21 to send chat file data to the client computer 2.

In step S18, the client computer 2 updates its display based on the received data, and the processing is brought to an end.

As described, the WWW server 1 translates part of the received text from the client computer 2 into a tag for linking to the relevant URL. Together, the text and the tag are sent to the client computer 2.

The keywords stored previously in the WWW server 1 and the URLs corresponding to the keywords may be sorted by user, by user group, by chat system, or by bulletin board.

The keywords stored beforehand in the WWW server 1 and the URLs corresponding to the keywords may alternatively be reserved previously by the administrator of the WWW server 1. The keywords and their URLs may also be registered by users.

Although the WWW server 1 was shown translating part of text into a tag for linking to the relevant URL, this is not limitative of the invention. Alternatively, the client computer 2 may translate the text before sending it out. As another alternative, the client computer 2 may translate the received text from the WWW server 1 into a tag for linking to the relevant URL.

Figure 11A:
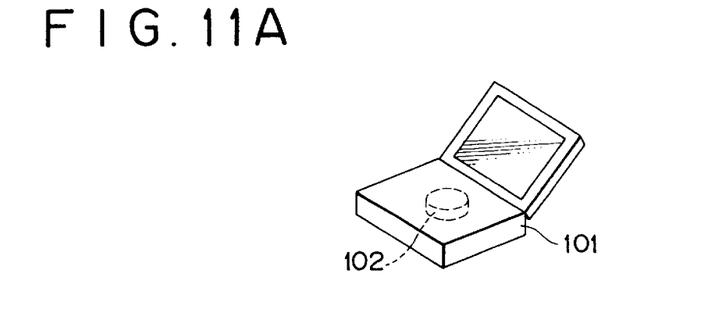
FIGS. 11A, 11B and 11C are explanatory views of storage media.
Figure 11B:
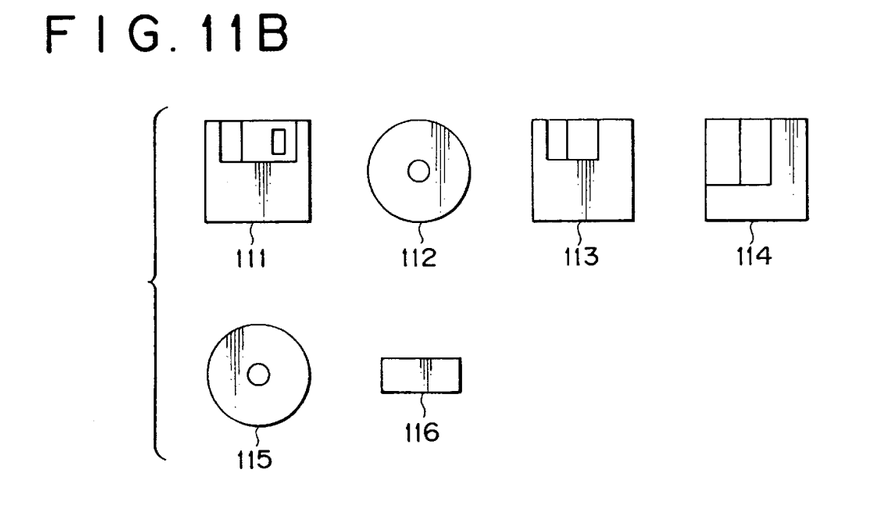
Figure 11C:
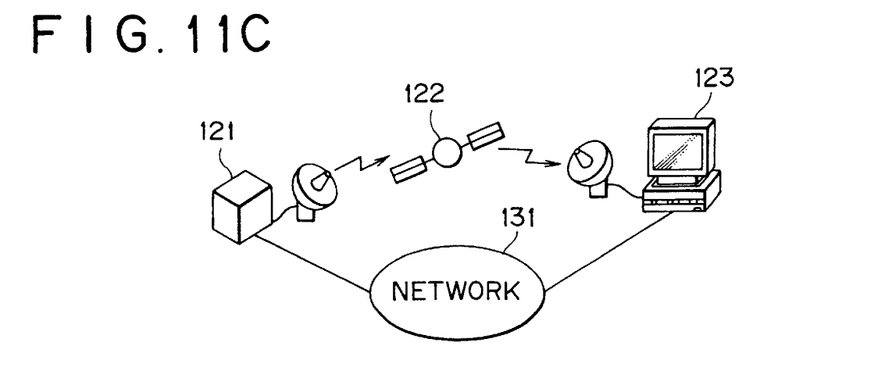

Described below with reference to FIGS. 11A, 11B and 11C are media used to install a program made up of the above-described processing steps into a computer in computer-executable format.

As shown in FIG. 11A, the program may be provided to users as preinstalled on a hard disk 102 (corresponding to the disk incorporated in the hard disk drive 19 in FIG. 2), which is a storage medium housed in a personal computer 101.

Alternatively, as depicted in FIG. 11B, the program may be provided as package software stored temporarily or permanently on such storage media as a floppy disk 111, a CD-ROM 112, MO disk 113, a DVD 114, a magnetic disk 115, and a semiconductor memory 116.

Furthermore, as indicated in FIG. 11C, the program may be transferred in a wireless fashion from a download site 121 to a personal computer 123 via a satellite 122; the program may also be transferred in a wired or wireless fashion over a network 131 (corresponding to the Internet 3 in FIG. 1) such as a local area network or the Internet to the personal computer 123. The transferred program may be downloaded onto an internal hard disk or other suitable storage device in the personal computer 123.

The media as understood in this specification refer to diverse kinds of media in their broadest sense including the storage media outlined above.

Also in this specification, the described steps constituting the program offered on a suitable medium include processes that may be carried out in diverse manners: on a time series basis, on a parallel basis, and/or on an individual basis.

In this specification, the system refers to an overall configuration of a plurality of interconnected relevant devices.

Through the use of the above-described information providing and processing apparatus, information providing and processing method, and information providing and processing program storage medium according to the invention, relations are recorded between predetermined keywords on the one hand and addresses for uniquely designating files corresponding to the keywords on the other hand. Any one of such keywords included in text data from an information processing apparatus is translated into data with a tag related to the address corresponding to the keyword in question. These features make it possible for each user to send to all other connected users easily and quickly an address for uniquely designating the location of relevant information.

As many apparently different embodiments of this invention may be made without departing from the spirit and scope thereof, it is to be understood that the invention is not limited to the specific embodiments thereof except as defined in the appended claims.

What is claimed is:

1. A computer-based system configured for network text-messaging services, comprising:

a first communications terminal configured to support network text-messaging;

a second communications terminal configured to support network text-messaging;

a server having an interface configured to relay text-messages exchanged between the first communications terminal and the second communications terminal; and a network connecting said first communications terminal, said second communications terminal, and said server, wherein said server further includes:

a memory configured to store relations between a predetermined keyword and an address uniquely designating a file on said network, said file not located on said first communications terminal, said second communications terminal, or said server;

a monitoring mechanism configured to monitor communications between said first communications terminal and said second communications terminal;

a detection mechanism configured to recognize the presence of said predetermined keyword in said communications; and a text conversion mechanism configured to convert said predetermined keyword in said communications into data with a tag related to said address of the file on the network.

2. The computer-based system of claim 1, wherein
said network comprises the Internet;
said communications comprises a Hypertext Markup Language (HTML) file; and
said address comprises Uniform Resource Locator (URL).

3. The computer-based system of claim 1, wherein said server further comprises:
a text highlighting mechanism configured to highlight said tag.

4. A server configured to support network text-messaging services, comprising:
an interface configured to relay text-messages exchanged between a first communications terminal and a second communications terminal over a network;
a memory configured to store relations between a predetermined keyword and an address uniquely designating a file on said network, said file not located on said first communications terminal, said second communications terminal, or said server;
a monitoring mechanism configured to monitor communications between said first communications terminal and said second communications terminal;
a detection mechanism configured to recognize the presence of said predetermined keyword in said communications; and
a text conversion mechanism configured to convert said predetermined keyword in said communications into data with a tag related to said address of the file on the network.

5. The server of claim 4, wherein
said network comprises the Internet;
said communications comprises a Hypertext Markup Language (HTML) file; and
said address comprises Uniform Resource Locator (URL).

6. The server of claim 4, further comprising:
a text highlighting mechanism configured to highlight said tag.

7. A method for network text-messaging services, comprising:
communicating between a first communications terminal and a second communications terminal over a network via network text-messaging;
monitonn by a serve communications between said first communications terminal and said second communications terminal;
storing relations between a predetermined keyword and an address uniquely designating a file on said network, said file not located on said first communications terminal, said second communications terminal, or said server;
recognizing the presence of said predetermined keyword in said communications; and
converting said predetermined keyword in said communications into data with a tag related to said address of the file on the network.

8. A method for supporting network text-messaging services, comprising:
monitoring by a serve text-messaging communications over a network between a first communications terminal and a second communications terminal;
storing relations between a predetermined keyword and an address uniquely designating a file on said network, said file not located on said first communications terminal, said second communications terminal, or said server;
recognizing the presence of said predetermined keyword in said communications; and
converting said predetermined keyword in said communications into data with a tag related to said address of the file on the network.

9. A computer program product containing instructions for supporting network text-messaging services, said instructions including instructions for:
monitoring by a server text-messaging communications over a network between a first communications terminal and a second communications terminal;
storing relations between a predetermined keyword and an address uniquely designating a file on said network, said file not located on said first communications terminal, said second communications terminal, or said server;
recognizing the presence of said predetermined keyword in said communications; and
converting said predetermined keyword in said communications into data with a tag related to said address of the file on the network.

* * * * *

UNITED STATES PATENT AND TRADEMARK OFFICE
CERTIFICATE OF CORRECTION

PATENT NO. : 6,785,740 B1
DATED : August 31, 2004
INVENTOR(S) : Michiaki Yoneda et al.

It is certified that error appears in the above-identified patent and that said Letters Patent is hereby corrected as shown below:

<u>Column 8,</u>
Line 1, change "monitonn by a serve communications" to -- monitoring communications by a server --;
Line 16, change "serve" to -- server --.

Signed and Sealed this

Eleventh Day of January, 2005

JON W. DUDAS
*Director of the United States Patent and Trademark Office*